US012273973B2

(12) United States Patent
Li et al.

(10) Patent No.: US 12,273,973 B2
(45) Date of Patent: Apr. 8, 2025

(54) AUTOMATIC COMPENSATION METHOD BASED ON TEMPERATURE CHARACTERISTICS OF RGB LEDs

(71) Applicant: LUMISSIL MICROSYSTEMS LIMITED, Fujian (CN)

(72) Inventors: YunFeng Li, Fujian (CN); JunHao Li, Fujian (CN); Hui Zhang, Fujian (CN); MingChi Huang, Fujian (CN); KunFu Lu, Fujian (CN)

(73) Assignee: LUMISSIL MICROSYSTEMS LIMITED, Fujian (CN)

( * ) Notice: Subject to any disclaimer, the term of this patent is extended or adjusted under 35 U.S.C. 154(b) by 85 days.

(21) Appl. No.: 18/242,008

(22) Filed: Sep. 5, 2023

(65) Prior Publication Data

US 2023/0422369 A1 Dec. 28, 2023

(30) Foreign Application Priority Data

Oct. 24, 2022 (CN) ........................ 202211303845.9

(51) Int. Cl.
*H05B 45/28* (2020.01)
*H05B 45/325* (2020.01)

(52) U.S. Cl.
CPC .......... *H05B 45/28* (2020.01); *H05B 45/325* (2020.01)

(58) Field of Classification Search
CPC .................... H05B 45/24; H05B 45/28; H05B 45/325-335; H05B 47/105
See application file for complete search history.

(56) References Cited

U.S. PATENT DOCUMENTS

| | | | | |
|---|---|---|---|---|
| 9,485,813 | B1 * | 11/2016 | Lewis | H05B 45/44 |
| 2009/0302781 | A1 * | 12/2009 | Peker | H05B 45/22 315/297 |
| 2013/0076250 | A1 * | 3/2013 | Logiudice | H05B 45/37 315/161 |

* cited by examiner

*Primary Examiner* — Renan Luque
(74) *Attorney, Agent, or Firm* — Cooper Legal Group, LLC

(57) ABSTRACT

An automatic compensation method based on temperature characteristics of RGB LEDs by first obtaining current temperatures of the RGB LEDs, and then adjusting a corresponding PWM duty cycle of each LED according to the current temperature of each LED to change drive currents of the RGB LEDs, thereby achieving compensation for the RGB LEDs. By determining a temperature adjustment coefficient of each LED based on the current temperature, temperature adjustment ratios, and an adjustment step size of the LED, and finally adjusting the PWM value according to the temperature adjustment coefficient to drive the LED, color shift is reduced. When performing PWM duty cycle adjustment, adjustment formulae are used, which only require obtaining the current temperature, the temperature adjustment ratios, and the adjustment step size of each LED, and then calculating according to the formula, therefore not requiring extensive data storage or data lookup and thus resulting in lesser computation.

4 Claims, 4 Drawing Sheets

AUTOMATIC COMPENSATION METHOD BASED ON TEMPERATURE CHARACTERISTICS OF RGB LEDs

BACKGROUND OF THE INVENTION

The present invention relates to the technical field of LED applications, and in particular to an automatic compensation method based on temperature characteristics of RGB LEDs.

In real-world applications, RGB LEDs are widely used for background lighting and illumination. As they become more commonly used, the demand for color and brightness uniformity becomes increasingly stringent. However, RGB LED light sources have a defect: the brightness diminishes with the rise in temperature, resulting in different brightness at different temperatures.

Currently, there are two main compensation methods. One method relies on adjusting the DC current based on temperature characteristics of the LED. However, this method often leads to relatively greater color shift and noticeable chromatic changes at high and low temperatures. Another method involves storing a lookup table in a chip, which, based on the LED's production batches and temperature characteristics, stores duty cycle coefficients for different temperature points to compensate for the temperature-induced losses. This latter method requires a substantial amount of computation and data storage.

BRIEF SUMMARY OF THE INVENTION

In view of the problems in the prior art, the present invention aims to provide an automatic compensation method based on temperature characteristics of RGB LEDs, which features a reduced color shift and lesser computation.

To achieve the above objects, the present invention provides the following technical solutions:

An automatic compensation method based on temperature characteristics of RGB LEDs, comprising the following steps:

obtaining current temperatures of a red LED, a green LED, and a blue LED of the RGB LEDs respectively; and adjusting a corresponding pulse width modulation (PWM) duty cycle of each LED according to the current temperature of each LED so as to change drive currents of the red LED, the green LED, and the blue LED, thereby achieving compensation for the RGB LEDs; wherein, a PWM duty cycle of the red LED is adjusted according to the following formula: $PWM_{OUT\_R}=PWM_{IN\_R}\times TC_R=PWM_{IN\_R}\times[1+(T_{\_ADC\_R}-T_{ADC@25\_R})/K_R\times N_R\%]$;

a PWM duty cycle of the green LED is adjusted according to the following formula: $PWM_{OUT\_G}=PWM_{IN\_G}\times TC_G=PWM_{IN\_G}\times[1+(T_{\_ADC\_G}-T_{ADC@25\_G})/K_G\times N_G\%]$;

a PWM duty cycle of the blue LED is adjusted according to the following formula: $PWM_{OUT\_B}=PWM_{IN\_B}\times TC_B=PWM_{IN\_B}\times[1+(T_{ADC\_B}-T_{ADC@25\_B})/K_B\times N_B\%]$;

wherein $PWM_{OUT\_R}$, $PWM_{OUT\_G}$, and $PWM_{OUT\_B}$ represent adjusted PWM values for the red LED, the green LED, and the blue LED respectively;

$PWM_{IN\_R}$, $PWM_{IN\_G}$, and $PWM_{IN\_B}$ represent original PWM values for the red LED, the green LED, and the blue LED respectively before adjustment;

$TC_R$, $TC_G$, and $TC_B$ represent temperature adjustment coefficients for the red LED, the green LED, and the blue LED respectively;

$T_{\_ADC\_R}$, $T_{ADC\_G}$, and $T_{ADC\_B}$ represent the current temperatures of the red LED, the green LED, and the blue LED respectively;

$T_{ADC@25\_R}$, $T_{ADC@25\_G}$, and $T_{ADC@25\_B}$ represent temperatures of the red LED, the green LED, and the blue LED respectively at room temperature;

$K_R$, $K_G$, and $K_B$ represent temperature adjustment step sizes for the red LED, the green LED, and the blue LED respectively, and values of $K_R$, $K_G$, and $K_B$ are identical.

$N_R\%$, $N_G\%$, and $N_B\%$ represent temperature adjustment percentages for the red LED, green LED, and the blue LED respectively.

The method also comprises the following steps: dividing a range of temperatures in which each LED operates into segments, resulting in segments being divided in a quantity "a" for the red LED, segments being divided in a quantity "b" for the green LED, and segments being divided in a quantity "c" for the blue LED respectively, and each segment of each LED has an independent temperature adjustment ratio; wherein, the red LED is provided with temperature adjustment ratios in said quantity "a", represented as $N_R\in\{N_{R1}, \ldots, N_{Ra}\}$ the green LED is provided with temperature adjustment ratios in said quantity "b", represented as $N_G\in\{N_{G1}, \ldots, N_{Gb}\}$; and the blue LED is provided with temperature adjustment ratios in said quantity "c", represented as $N_B\in\{N_{B1}, \ldots, N_{Bc}\}$.

The method also comprises the following steps: during temperature compensation process, hysteresis processing is performed for each of the red, the green, and the blue LEDs;

specifically, when the current temperature of each LED is obtained, determining whether the current temperature of the LED is greater than α or less than 3; when the current temperature is greater than α or less than 3, a new current temperature value is assigned to a corresponding PWM duty cycle adjustment formula, and α and β values are updated at the same time, where $\alpha=T_{\_ADC}+K/2$; $\beta=T_{\_ADCc}-K/2$, and once updated, the current temperature of the LED is obtained again for hysteresis processing.

The method mentioned above is implemented through a compensation circuit, which comprises a red LED forward voltage-sense amplifier, a green LED forward voltage-sense amplifier, a blue LED forward voltage-sense amplifier, a driver chip, an on-chip temperature sensor provided within the driver chip, an analog-to-digital converter, a register, and a coefficient determination module; a red LED driver module, a green LED driver module, and a blue LED driver module are provided within the driver chip.

Two input terminals of the red LED forward voltage-sense amplifier are connected to two terminals of the red LED, and an output terminal of the red LED forward voltage-sense amplifier is connected to an input terminal of the analog-to-digital converter; two input terminals of the green LED forward voltage-sense amplifier are connected to two terminals of the green LED, and an output terminal of the green LED forward voltage-sense amplifier is connected to the input terminal of the analog-to-digital converter; two input terminals of the blue LED forward voltage-sense amplifier are connected to two terminals of the blue LED, and an output terminal of the blue LED forward voltage-sense amplifier is connected to the input terminal of the analog-to-digital converter.

The on-chip temperature sensor is connected to the input terminal of the analog-to-digital converter; an output terminal of the analog-to-digital converter is connected to an input terminal of the register; an output terminal of the register is connected to the coefficient determination module, and an output terminal of the coefficient determination module is connected to the red LED driver module, the green LED driver module, and the blue LED driver module.

According to the technical solutions described above, the automatic compensation method of the present invention determines the temperature adjustment coefficient of each LED based on the current temperature, the temperature adjustment ratios, and the adjustment step size of the LED, and finally adjusts the PWM value according to the temperature adjustment coefficient to drive the LED. Accordingly, color shift is reduced. Additionally, when performing a PWM duty cycle adjustment, the present invention utilizes adjustment formula for the adjustment, which only requires obtaining the current temperature, the temperature adjustment ratios, and the adjustment step size, and then calculating according to the formula. There is no need for extensive data storage or data lookup, thereby resulting in lesser computation.

DETAILED DESCRIPTION OF THE INVENTION

The present invention discloses an automatic compensation method based on temperature characteristics of RGB LEDs, which achieves compensation for the RGB LEDs by separately obtaining current temperatures of a red LED, a green LED, and a blue LED of the RGB LEDs respectively, and then adjusting a corresponding pulse width modulation (PWM) duty cycle according to the current temperature of each LED so as to change drive currents of the red LED, the green LED, and the blue LED.

A PWM duty cycle of the red LED is adjusted according to the following formula: $PWM_{OUT\_R}=PWM_{IN\_R}\times TC_R=PWM_{IN\_R}\times[1+(T_{\_ADC\_R}-T_{ADC@25\_R})/K_R\times N_R\ \%]$ A PWM duty cycle of the green LED is adjusted according to the following formula: $PWM_{OUT\_G}=PWM_{IN\_G}\times TC_G=PWM_{IN\_G}\times[1+(T_{\_ADC\_G}-T_{ADC@25\_G})/K_G\times N_G\ \%]$, A PWM duty cycle of the blue LED is adjusted according to the following formula: $PWM_{OUT\_B}=PWM_{IN\_B}\times TC_B=PWM_{IN\_B}\times[1+(T_{ADC\_B}-T_{ADC@25\_B})/K_B\times N_B\ \%]$.

wherein $PWM_{OUT\_R}$, $PWM_{OUT\_G}$, and $PWM_{OUT\_B}$ represent adjusted PWM values for the red LED, the green LED, and the blue LED respectively;

$PWM_{IN\_R}$, $PWM_{IN\_G}$, and $PWM_{IN\_B}$ represent original PWM values for the red LED, the green LED, and the blue LED respectively before adjustment;

$TC_R$, $TC_G$, and $TC_B$ represent temperature adjustment coefficients for the red LED, the green LED, and the blue LED respectively;

$T_{\_ADC\_R}$, $T_{ADC\_G}$, and $T_{ADC\_B}$ represent the current temperatures of the red LED, the green LED, and the blue LED respectively;

$T_{ADC@25\_R}$, $T_{ADC@25\_G}$, and $T_{ADC@25\_B}$ represent temperatures of the red LED, the green LED, and the blue LED respectively at room temperature;

$K_R$, $K_G$, and $K_B$ represent temperature adjustment step sizes for the red LED, the green LED, and the blue LED respectively, which are usually set to be identical for all the red LED, the green LED, and the blue LED.

$N_R\%$, $N_G\%$, and $N_B\%$ represent temperature adjustment percentages for the red LED, green LED, and the blue LED respectively.

Figure 1:
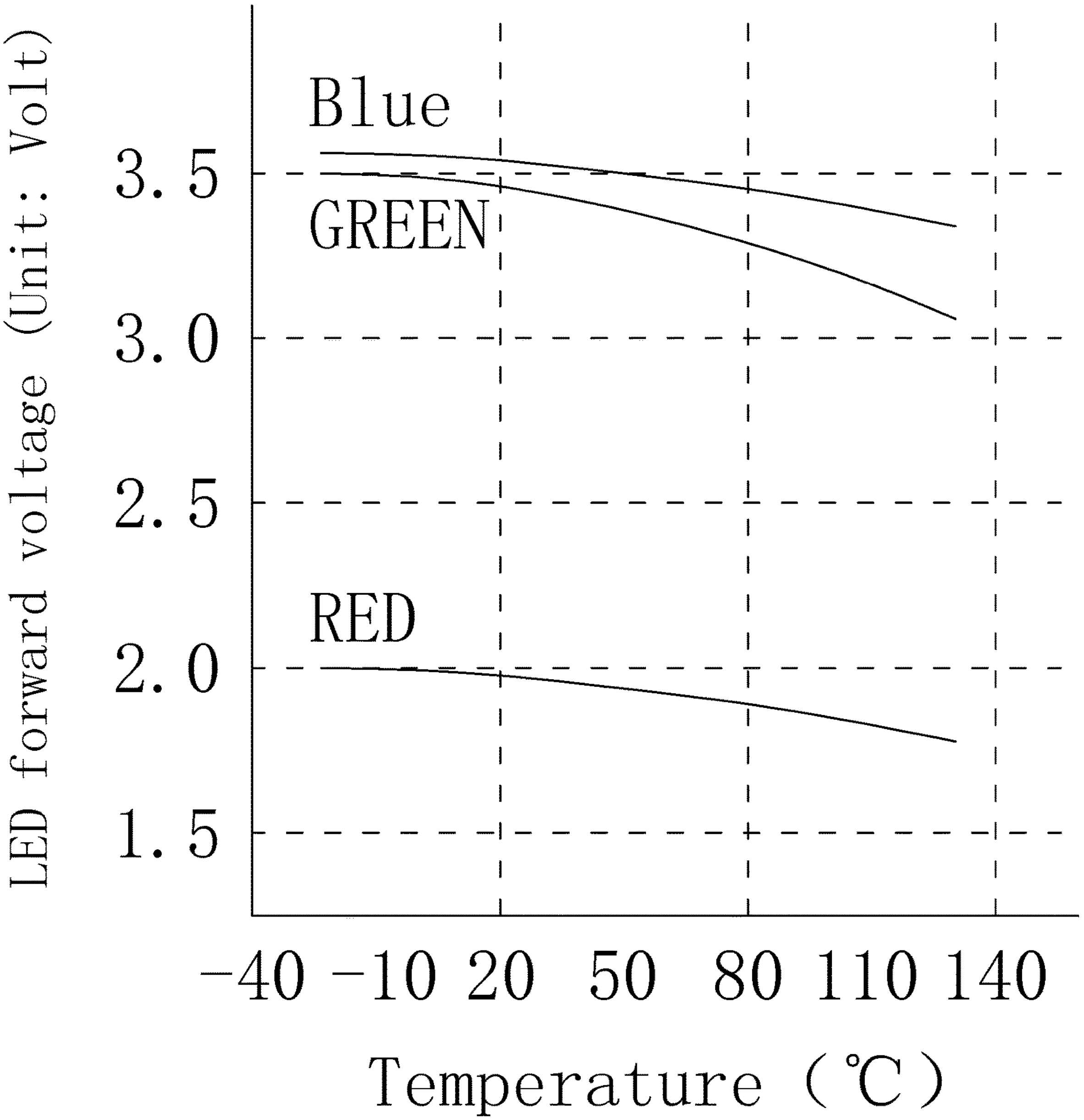
FIG. 1 shows curves representing relative relationships of the forward voltages of the LEDs with different temperatures.

The current temperatures of the red LED, the green LED, and the blue LED can be obtained either through detection by an on-chip temperature sensor of a driver chip, or by first measuring forward voltages of the red, green, and blue LEDs and then obtaining the current temperature of each of the LEDs according to a relative relationship of the forward voltage of the corresponding LED with different temperatures, as shown in FIG. 1. Specifically, when the red, green, and blue LEDs are packaged together with the driver chip, temperatures detected by the on-chip temperature sensor of the driver chip can reflect the current temperatures of the red, green, and blue LEDs. Therefore, the current temperatures of the red, green, and blue LEDs are equal to and taken from the temperatures detected by the on-chip temperature sensor.

Figure 2:
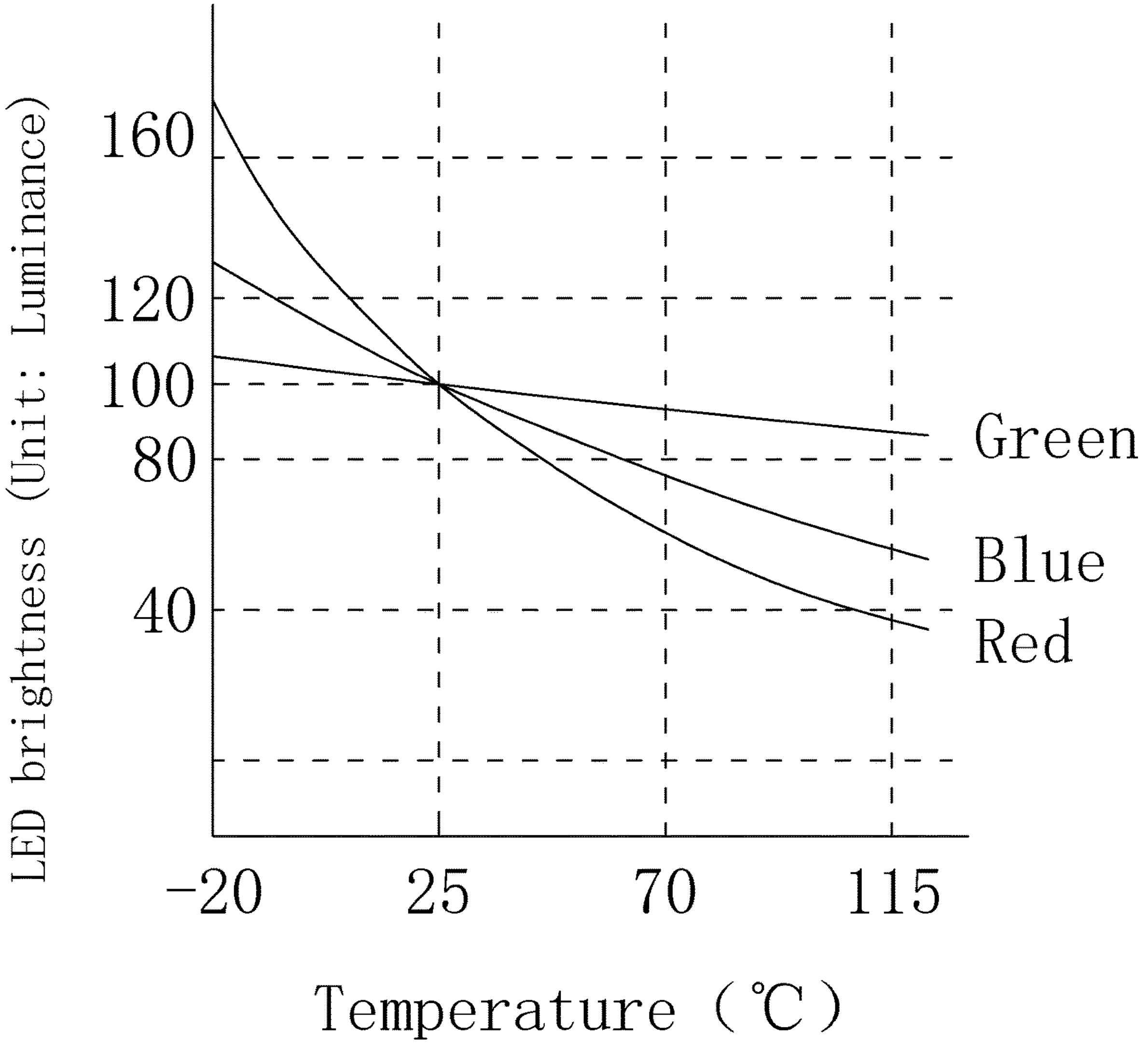
FIG. 2 shows attenuation curves of the brightness of the LEDs in relation to the rise in temperature.

As shown in FIG. 1, there is a relative relationship of the forward voltages of the red, the green, and the blue LEDs with different temperatures. Therefore, by detecting the forward voltage of each LED, the current temperature of each LED can be obtained. Specifically, when the red, the green, and the blue LEDs are not yet packaged together with the driver chip, the forward voltage of each LED is measured, and the current temperature of each LED is determined according to the forward voltage. The current temperatures of the red, green, and blue LEDs may be slightly different from one another. As shown in FIG. 2, the brightness of the LEDs exhibits a certain attenuation with the rise in temperature. Therefore, temperature adjustment ratios are determined according to attenuation curves of the brightness of the LEDs in relation to the rise in temperature. Additionally, LEDs of different types and production parameters have different attenuation coefficients, thereby resulting in different temperature adjustment ratios. Therefore, the temperature adjustment ratios for the red, green, and blue LEDs are different. With continued reference to FIG. 2, a relationship between the attenuation of the brightness of each LED in relation to the rise in temperature is not linear. To address this, the present invention achieves compensation through segmented linear compensation, which means a range of temperatures in which each LED operates is divided into segments, and the temperature adjustment ratios are different in different segments.

Figure 3:
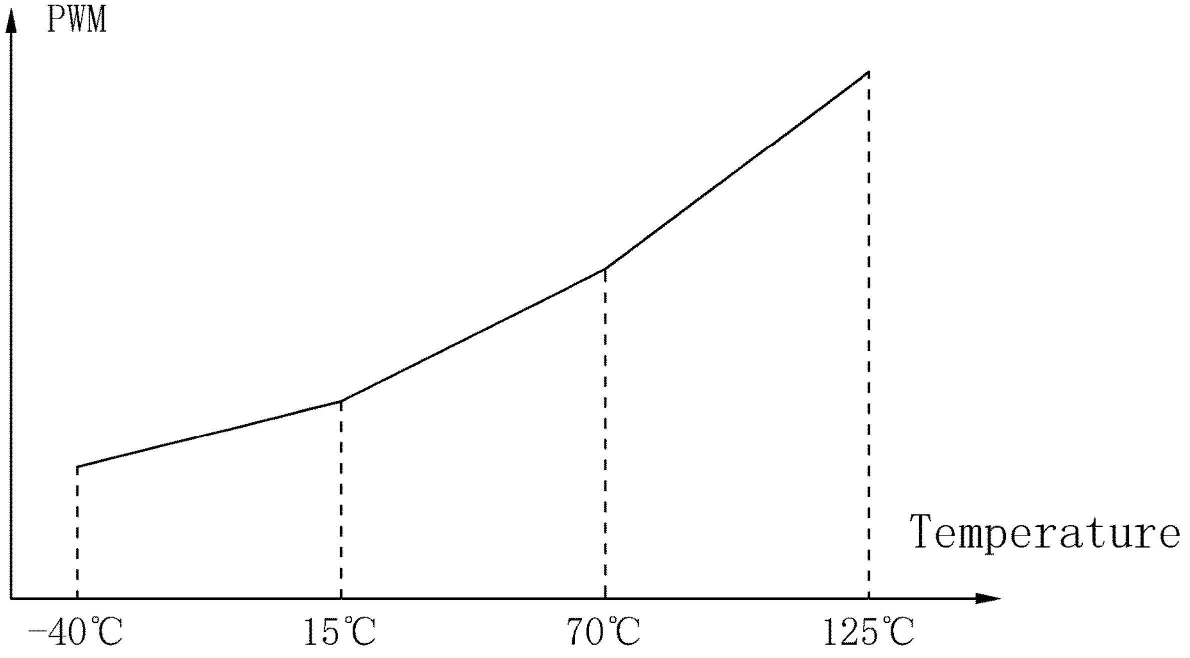
FIG. 3 is a schematic diagram of the segmented linear compensation according to an embodiment of the present invention.
Figure 4:
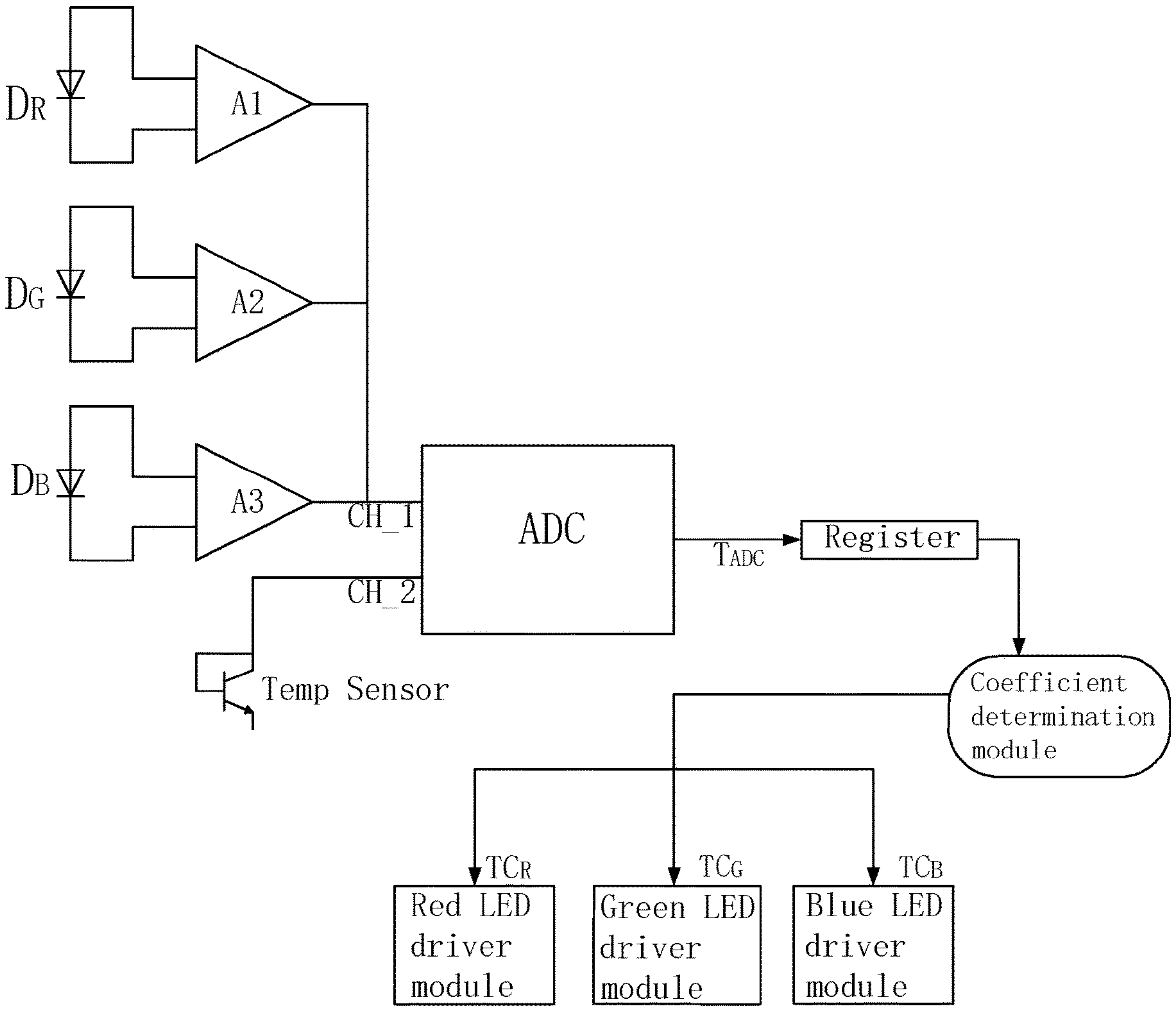
FIG. 4 is a schematic diagram of the compensation circuit according to the present invention.

Specifically, the present invention divides the range of temperatures in which each LED operates into segments; there are segments in quantity "a" for the red LED, segments in quantity "b" for the green LED, and segments in quantity "c" for the blue LED respectively, and each segment of each LED has a specific temperature adjustment ratio. "a", "b", and "c" can have identical values. Accordingly, the red LED is provided with temperature adjustment ratios in quantity "a", i.e. $N_R \in \{N_{R1}, \ldots, N_{Ra}\}$, the green LED is provided with temperature adjustment ratios in quantity "b", i.e. $N_G \in \{N_{G1}, \ldots, N_{Gb}\}$; and the blue LED is provided with temperature adjustment ratios of quantity "c", i.e. $N_B \in \{N_{B1}, \ldots, N_{Bc}\}$. According to an embodiment of the present invention as shown in FIG. 3, the range of temperatures in which each LED operates is divided into three segments.

The compensation method mentioned above is implemented through a compensation circuit, which comprises a red LED forward voltage-sense amplifier A1, a green LED forward voltage-sense amplifier A2, a blue LED forward voltage-sense amplifier A3, an on-chip temperature sensor (Temp Sensor) provided within a driver chip, an analog-to-digital converter (ADC), a register, and a coefficient determination module. A red LED driver module, a green LED driver module, and a blue LED driver module are provided within the driver chip. Two input terminals of the red LED forward voltage-sense amplifier A1 are connected to two terminals of a red LED ($D_R$), and an output terminal of the red LED forward voltage-sense amplifier A1 is connected to an input terminal of the ADC; two input terminals of the green LED forward voltage-sense amplifier A2 are connected to two terminals of a green LED ($D_G$), and an output terminal of the green LED forward voltage-sense amplifier A2 is connected to the input terminal of the ADC; two input terminals of the blue LED forward voltage-sense amplifier A3 are connected to two terminals of a blue LED ($D_B$), and an output terminal of the blue LED forward voltage-sense amplifier A3 is connected to the input terminal of the ADC. The on-chip temperature sensor is connected to the input terminal of the ADC. An output terminal of the ADC is connected to an input terminal of the register; temperature values output from the output terminal of the ADC represents current temperatures of the red LED, the green LED, and the blue LED. An output terminal of the register is connected to the coefficient determination module, and an output terminal of the coefficient determination module is connected to the red LED driver module, the green LED driver module, and the blue LED driver module. The coefficient determination module is configured to calculate a temperature adjustment coefficient for the red LED, a temperature adjustment coefficient for the green LED, and a temperature adjustment coefficient for the blue LED. When the temperature adjustment coefficient for the red LED is calculated, the temperature adjustment coefficient for the red LED is output to the red LED driver module; when the temperature adjustment coefficient for the green LED is calculated, the temperature adjustment coefficient for the green LED is output to the green LED driver module; when the temperature adjustment coefficient for the blue LED is calculated, the temperature adjustment coefficient for the blue LED is output to the blue LED driver module.

During temperature compensation process, to prevent continuous PWM adjustments at fixed temperature points due to the influence of noise, hysteresis is required to ensure that the LEDs do not experience flickering. Hysteresis processing is performed for each of the red, the green, and the blue LEDs. Specifically, the current temperature of each LED is obtained, and then it is determined whether the current temperature of the LED is greater than α or less than β. When the current temperature is greater than α or less than β, a new current temperature value is assigned to a corresponding PWM duty cycle adjustment formula, and α and β values are updated at the same time, where $\alpha = T_{\_ADC} + K/2$, $\mu 3 = T_{\_ADc} - K/2$, and once updated, the current temperature of the LED is obtained again for hysteresis processing.

The automatic compensation method of the present invention determines the temperature adjustment coefficient of each LED based on the current temperature, the temperature adjustment ratios, and the adjustment step size of the LED, and finally adjusts the PWM value according to the temperature adjustment coefficient to drive the LED. Accordingly, color shift is reduced. Additionally, when performing a PWM duty cycle adjustment, the present invention utilizes adjustment formula for the adjustment, which only requires obtaining the current temperature, the temperature adjustment ratios, and the adjustment step size, and then calculating according to the formula. There is no need for extensive data storage or data lookup, thereby resulting in lesser computation.

The above description is only embodiments of the present invention, and is not intended to limit the technical scope of the present invention, so any minor modifications, equivalent changes, and modifications made to the above embodiments according to the technical essence of the present invention still belong to the scope of the technical solution of the present invention.

What is claimed is:

1. An automatic compensation method based on temperature characteristics of RGB LEDs, comprising the following steps:

obtaining current temperatures of a red LED, a green LED, and a blue LED of the RGB LEDs respectively; and adjusting a corresponding pulse width modulation (PWM) duty cycle of each LED according to the current temperature of each LED so as to change drive currents of the red LED, the green LED, and the blue LED, thereby achieving compensation for the RGB LEDs; wherein, a PWM duty cycle of the red LED is adjusted according to the following formula: $PWM_{OUT\_R} = PWM_{IN\_R} \times TC_R = PWM_{IN\_R} \times [1 + (T_{\_ADC\_R} - T_{ADC@25\_R})/K_R \times N_R\%]$;

a PWM duty cycle of the green LED is adjusted according to the following formula: $PWM_{OUT\_G} = PWM_{IN\_G} \times TC_G = PWM_{IN\_G} \times [1 + (T_{\_ADC\_G} - T_{ADC@25\_G})/K_G \times N_G\%]$;

a PWM duty cycle of the blue LED is adjusted according to the following formula: $PWM_{OUT\_B} = PWM_{IN\_B} \times TC_B = PWM_{IN\_B} \times [1 + (T_{ADC\_B} - T_{ADC@25\_B})/K_B \times N_B\%]$;

wherein $PWM_{OUT\_R}$, $PWM_{OUT\_G}$, and $PWM_{OUT\_B}$ represent adjusted PWM values for the red LED, the green LED, and the blue LED respectively;

$PWM_{IN\_R}$, $PWM_{IN\_G}$, and $PWM_{IN\_B}$ represent original PWM values for the red LED, the green LED, and the blue LED respectively before adjustment;

$TC_R$, $TC_G$, and $TC_B$ represent temperature adjustment coefficients for the red LED, the green LED, and the blue LED respectively;

$T_{\_ADC\_R}$, $T_{ADC\_G}$, and $T_{ADC\_B}$ represent the current temperatures of the red LED, the green LED, and the blue LED respectively;

$T_{ADC@25\_R}$, $T_{ADC@25\_G}$, and $T_{ADC@25\_B}$ represent temperatures of the red LED, the green LED, and the blue LED respectively at room temperature;

$K_R$, $K_G$, and $K_B$ represent temperature adjustment step sizes for the red LED, the green LED, and the blue LED respectively, and values of $K_R$, $K_G$, and $K_B$ are identical;

$N_R$%, $N_G$%, and $N_B$% represent temperature adjustment percentages for the red LED, green LED, and the blue LED respectively.

2. The automatic compensation method of claim 1, also comprising the following steps: dividing a range of temperatures in which each LED operates into segments, resulting in segments being divided in a quantity "a" for the red LED, segments being divided in a quantity "b" for the green LED, and segments being divided in a quantity "c" for the blue LED respectively, and each segment of each LED has an independent temperature adjustment ratio; wherein, the red LED is provided with temperature adjustment ratios in said quantity "a", represented as $N_R \in \{N_{R1}, \ldots, N_{Ra}\}$;

the green LED is provided with temperature adjustment ratios in said quantity "b", represented as $N_G \in \{N_{G1}, \ldots, N_{Gb}\}$; and the blue LED is provided with temperature adjustment ratios in said quantity "c", represented as $N_B \in \{N_{B1}, \ldots, N_{Bc}\}$.

3. The automatic compensation method of claim 1, also comprising the following steps: during temperature compensation process, hysteresis processing is performed for each of the red, the green, and the blue LEDs; wherein, when the current temperature of each LED is obtained, determining whether the current temperature of the LED is greater than a or less than β; when the current temperature is greater than α or less than β, a new current temperature value is assigned to a corresponding PWM duty cycle adjustment formula, and α and β values are updated at the same time, where $\alpha = T_{\_ADC} + K/2$; $\beta = T_{\_ADC} - K/2$, and once updated, the current temperature of the LED is obtained again for hysteresis processing.

4. A compensation circuit for implementing the automatic compensation method of claim 1; wherein the compensation circuit comprises a red LED forward voltage-sense amplifier, a green LED forward voltage-sense amplifier, a blue LED forward voltage-sense amplifier, a driver chip, an on-chip temperature sensor provided within the driver chip, an analog-to-digital converter, a register, and a coefficient determination module; a red LED driver module, a green LED driver module, and a blue LED driver module are provided within the driver chip;

two input terminals of the red LED forward voltage-sense amplifier are connected to two terminals of the red LED, and an output terminal of the red LED forward voltage-sense amplifier is connected to an input terminal of the analog-to-digital converter; two input terminals of the green LED forward voltage-sense amplifier are connected to two terminals of the green LED, and an output terminal of the green LED forward voltage-sense amplifier is connected to the input terminal of the analog-to-digital converter; two input terminals of the blue LED forward voltage-sense amplifier are connected to two terminals of the blue LED, and an output terminal of the blue LED forward voltage-sense amplifier is connected to the input terminal of the analog-to-digital converter;

the on-chip temperature sensor is connected to the input terminal of the analog-to-digital converter; an output terminal of the analog-to-digital converter is connected to an input terminal of the register; an output terminal of the register is connected to the coefficient determination module, and an output terminal of the coefficient determination module is connected to the red LED driver module, the green LED driver module, and the blue LED driver module.

* * * * *